US011914243B2

(12) United States Patent
Noguchi

(10) Patent No.: US 11,914,243 B2
(45) Date of Patent: Feb. 27, 2024

(54) DISPLAY DEVICE

(71) Applicant: Japan Display Inc., Tokyo (JP)

(72) Inventor: Michikazu Noguchi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/222,568

(22) Filed: Jul. 17, 2023

(65) Prior Publication Data

US 2024/0027821 A1    Jan. 25, 2024

(30) Foreign Application Priority Data

Jul. 19, 2022    (JP) ................................. 2022-114873

(51) Int. Cl.
    *G02F 1/1335*    (2006.01)
    *G02F 1/13357*   (2006.01)
    *F21V 8/00*      (2006.01)

(52) U.S. Cl.
    CPC ..... *G02F 1/133524* (2013.01); *G02B 6/0031* (2013.01); *G02B 6/0055* (2013.01); *G02B 6/0068* (2013.01); *G02B 6/0076* (2013.01); *G02F 1/133615* (2013.01); *G02B 6/0073* (2013.01)

(58) Field of Classification Search
    CPC ......... G02F 1/133524; G02F 1/133615; G02B 6/0031; G02B 6/0055; G02B 6/0068; G02B 6/0076; G02B 6/0073; G02B 6/42; G02B 6/4204
    See application file for complete search history.

(56) References Cited

U.S. PATENT DOCUMENTS

2021/0223465 A1    7/2021   Numata et al.

FOREIGN PATENT DOCUMENTS

JP    2020-60682 A         4/2020
KR    20170138988 A   *   12/2017   ........... G02B 6/0076

OTHER PUBLICATIONS

Machine translation of KR 20170138988 A (Year: 2017).*

* cited by examiner

*Primary Examiner* — Anne M Hines
*Assistant Examiner* — Jose M Diaz
(74) *Attorney, Agent, or Firm* — Michael Best & Friedrich LLP

(57) ABSTRACT

A display panel (display device) includes a first light guide plate, a second light guide plate, a first light source unit, a second light source unit, and a reflection film. In a display region, an air layer is interposed between a first substrate and the first light guide plate, and a second adhesive layer is interposed between a second substrate and the second light guide plate. In a peripheral region, the first light guide plate, a first adhesive layer, the first substrate, the second substrate, the second adhesive layer, and the second light guide plate are interposed between a first reflection surface and a second reflection surface of the reflection film.

10 Claims, 7 Drawing Sheets

DISPLAY DEVICE

CROSS REFERENCE TO RELATED APPLICATIONS

The present application claims priority to Japanese Patent Application No. 2022-114873 filed on Jul. 19, 2022, the disclosure of which is incorporated herein by reference.

TECHNICAL FIELD OF THE INVENTION

The present invention relates to a display device using a liquid crystal layer.

BACKGROUND OF THE INVENTION

As a display device using a liquid crystal layer, there is a transparent display device in which light transmittance of substrates sandwiching a liquid crystal layer is improved, whereby an observer can recognize a display image and a background superimposed on each other (see Japanese Unexamined Patent Application Publication No. 2020-060682 (Patent Document 1)).

SUMMARY OF THE INVENTION

The inventors of this application have been developing a transparent display device in which an observer can recognize a display image and a background superimposed on each other. In the case of a transparent display device, each of the front surface and the back surface needs to have the property of transmitting visible light. Therefore, a light source unit for displaying an image is arranged on a side surface of a light guide plate. According to the studies by the inventors of this application, it has been found that the following problems occur when the light source unit is arranged so as to face the side surface of the light guide plate. Namely, it has been found that the luminance distribution in the display region is not uniform, and the luminance is lowered in a region far from the light source unit. In other words, a luminance gradient occurs in the display region.

On the other hand, if arranging the light source units along mutually opposite two sides of the rectangular display region in order to eliminate the luminance gradient described above, the visibility of the observer when recognizing the display image and the background superimposed on each other is degraded. An object of the present invention is to provide a technique capable of improving the performance of the transparent display device.

A display device according to one aspect is a display device having a display region and a peripheral region around the display region. The display device includes: a first substrate having a first front surface and a first back surface on a side opposite to the first front surface; a second substrate having a second back surface facing the first front surface and a second front surface on a side opposite to the second back surface; a liquid crystal layer arranged between the first front surface of the first substrate and the second back surface of the second substrate; a first light guide plate which has a first light incident side surface and a first opposite side surface located on a side opposite to the first light incident side surface in a first direction and is bonded and fixed on the first back surface of the first substrate via a first adhesive layer; a second light guide plate which has a second light incident side surface and a second opposite side surface located on a side opposite to the second light incident side surface in the first direction and is bonded and fixed on the second front surface of the second substrate via a second adhesive layer; a first light source unit which includes a plurality of first light emitting diode elements, is arranged on the first back surface of the first substrate, and is arranged at a position facing the first light incident side surface of the first light guide plate; a second light source unit which includes a plurality of second light emitting diode elements, is arranged on the first front surface of the first substrate, and is arranged at a position facing the second light incident side surface of the second light guide plate; and a reflection film covering the first opposite side surface and the second opposite side surface. The first light incident side surface of the first light guide plate and the second light incident side surface of the second light guide plate are on the same side in the first direction. The first adhesive layer is arranged in the peripheral region. The second adhesive layer is arranged in the display region. In the display region, an air layer is interposed between the first substrate and the first light guide plate, and the second adhesive layer is interposed between the second substrate and the second light guide plate. The reflection film has a first reflection surface attached to the first opposite side surface and a second reflection surface attached to the second opposite side surface. In the peripheral region, the first light guide plate, the first adhesive layer, the first substrate, the second substrate, the second adhesive layer, and the second light guide plate are interposed between the first reflection surface and the second reflection surface.

A display device according to another aspect is a display device having a display region and a peripheral region around the display region. The display device includes: a first substrate having a first front surface and a first back surface on a side opposite to the first front surface; a second substrate having a second back surface facing the first front surface and a second front surface on a side opposite to the second back surface; a liquid crystal layer arranged between the first front surface of the first substrate and the second back surface of the second substrate; a first light guide plate which has a first light incident side surface and a first opposite side surface located on a side opposite to the first light incident side surface in a first direction and is bonded and fixed on the first back surface of the first substrate via a first adhesive layer; a second light guide plate which has a second light incident side surface and a second opposite side surface located on a side opposite to the second light incident side surface in the first direction and is bonded and fixed on the second front surface of the second substrate via a second adhesive layer; a first light source unit which includes a plurality of first light emitting diode elements, is arranged on the first back surface of the first substrate, and is arranged at a position facing the first light incident side surface of the first light guide plate; a second light source unit which includes a plurality of second light emitting diode elements, is arranged on the first front surface of the first substrate, and is arranged at a position facing the second light incident side surface of the second light guide plate; and a reflection film covering the first opposite side surface and the second opposite side surface. The first light incident side surface of the first light guide plate and the second light incident side surface of the second light guide plate are on the same side in the first direction. The first adhesive layer is arranged in the peripheral region. The second adhesive layer is arranged in the display region. In the display region, an air layer is interposed between the first substrate and the first light guide plate, and the second adhesive layer is interposed between the second substrate and the second light guide plate. The reflection film has a first reflection surface attached to the first opposite side surface and a second reflection surface attached to the second opposite side surface. Light emitted from the first light source unit reaches the second reflection surface via the first light guide plate, the first reflection surface, the first adhesive layer, the first substrate, the second substrate, the second adhesive layer, and the second light guide plate.

BRIEF DESCRIPTIONS OF THE DRAWINGS

DESCRIPTIONS OF THE PREFERRED EMBODIMENTS

Figure 1:
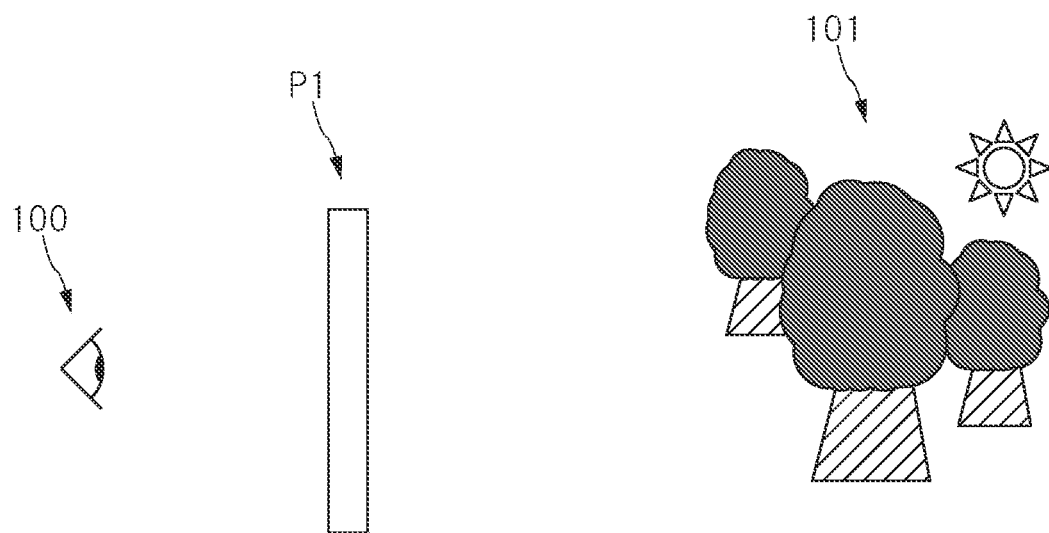
FIG. 1 is an explanatory diagram showing a positional relationship when an observer who is on one surface side of a transparent display panel visually recognizes a background located on an opposite surface side through the transparent display panel.

Hereinafter, each embodiment of the present invention will be described with reference to drawings. Note that the disclosure is mere an example, and it is a matter of course that any alteration that is easily made by a person skilled in the art while keeping a gist of the present invention is included in the range of the present invention. In addition, the drawings schematically illustrate a width, a thickness, a shape, and the like of each portion as compared with actual aspects in order to make the description clearer, but the drawings are mere examples and do not limit the interpretation of the present invention. Further, the same elements as those described in relation to the foregoing drawings are denoted by the same or related reference characters in this specification and the respective drawings, and detailed descriptions thereof will be omitted as appropriate.

In the following embodiment, a liquid crystal display device configured to display an image by using scattering of visible light by liquid crystal molecules will be described as an example of a display panel used in combination with a glass plate.

Also, a liquid crystal display device is configured to form a display image by changing the orientation of molecules contained in a liquid crystal layer, but it requires a light source. In the embodiment described below, a light source is provided separately from the display panel. Therefore, the display panel and the light source module that supplies visible light to the display panel will be described separately below.

<Transparent Display Panel>

Figure 2:
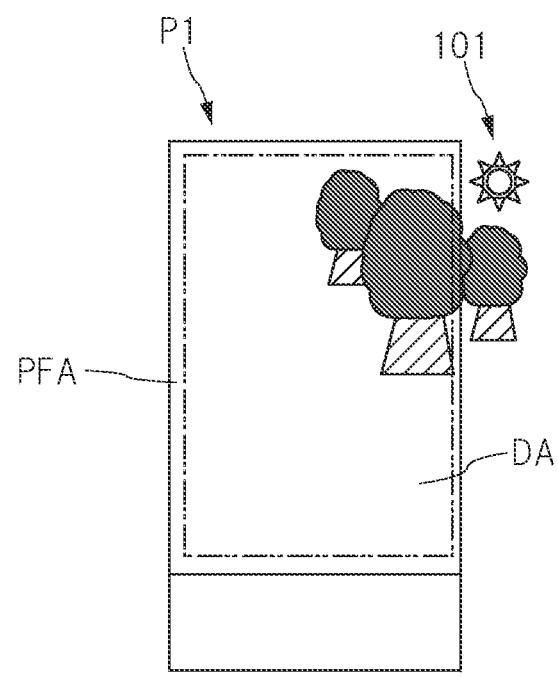
FIG. 2 is an explanatory diagram showing an example of the background visually recognized through the transparent display panel.

First, the features of the so-called transparent display panel will be described. FIG. 1 is an explanatory diagram showing a positional relationship when an observer who is on one surface side of a transparent display panel visually recognizes a background located on an opposite surface side through the transparent display panel. FIG. 2 is an explanatory diagram showing an example of the background visually recognized through the transparent display panel.

As shown in FIG. 1, when an observer 100 on one side of a display panel P1 views the other side of the panel, a background 101 is visually recognized through the display panel P1. As shown in FIG. 2, when both a display region DA and a peripheral region PFA outside the display region DA transmit light, the observer 100 can visually recognize the entire background 101 without discomfort. On the other hand, when the peripheral region PFA has a light blocking property that does not transmit light, a part of the background 101 visually recognized through the display panel P1 is interrupted by the peripheral region PFA, and the observer 100 may feel a discomfort (see FIG. 1). Thus, in the case of the display panel P1 which is a transparent display panel, it is preferable that each of the display region DA and the peripheral region PFA has visible light transmissivity. Moreover, from the viewpoint of visually recognizing the background 101 without discomfort, it is particularly preferable that each of the display region DA and the peripheral region PFA has approximately the same visible light transmissivity.

Figure 3:
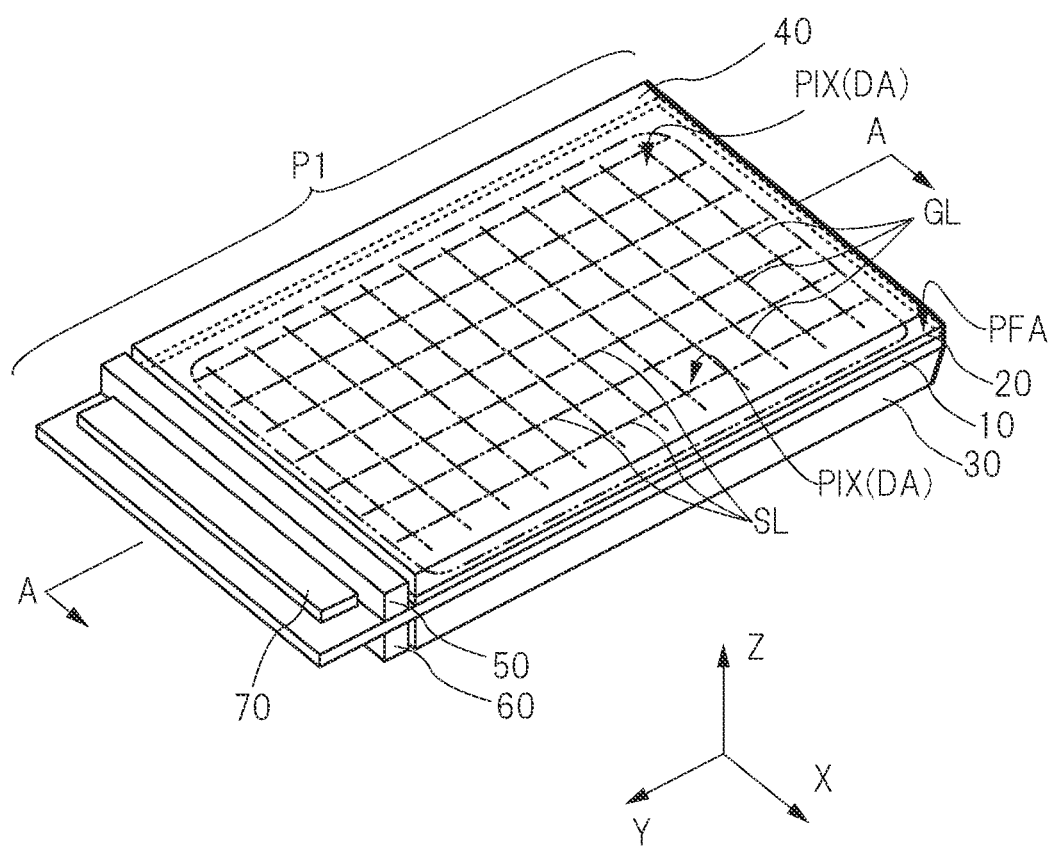
FIG. 3 is a perspective view showing an example of the transparent display panel shown in FIG. 1.
Figure 4:
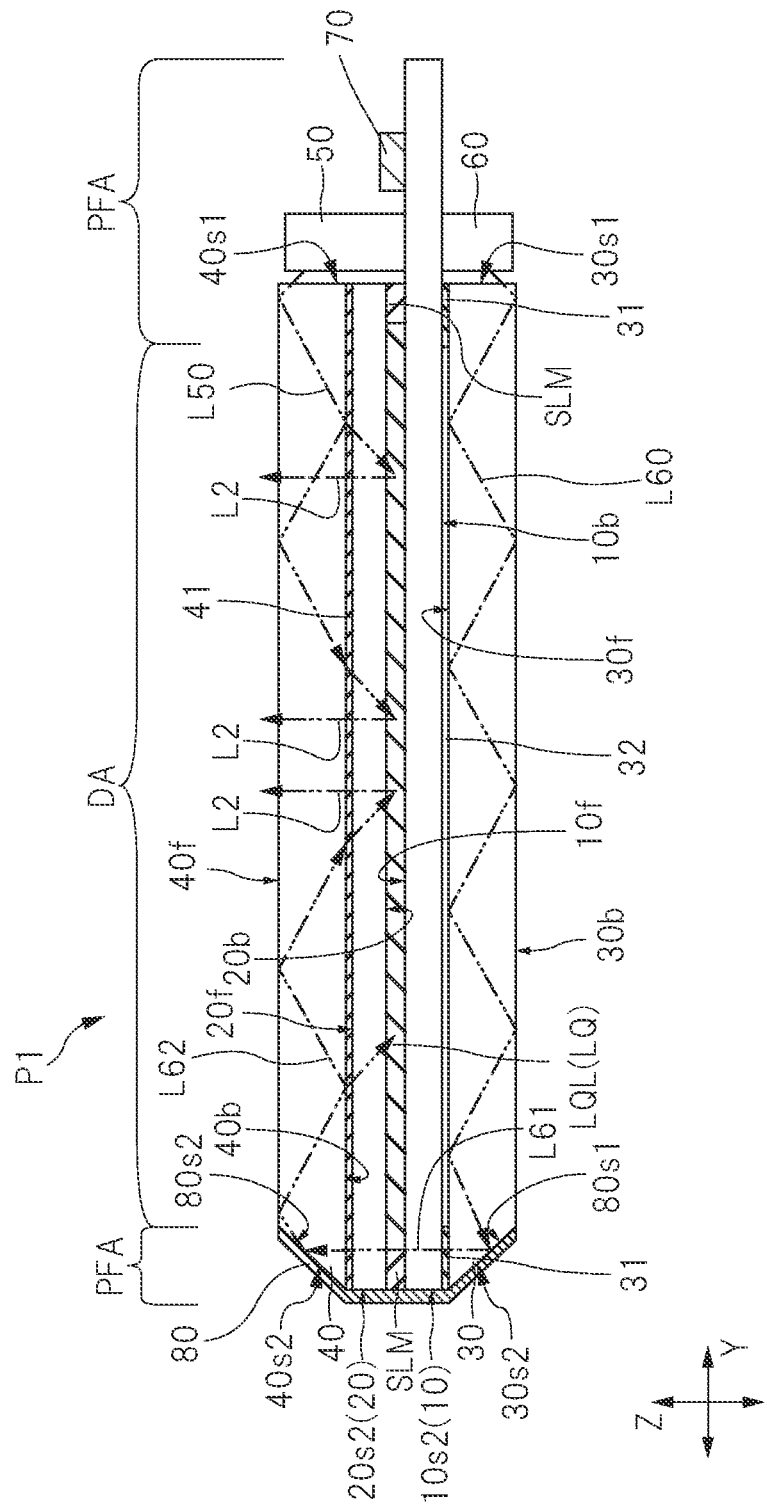
FIG. 4 is a cross-sectional view taken along the line A-A in FIG. 3.
Figure 5:
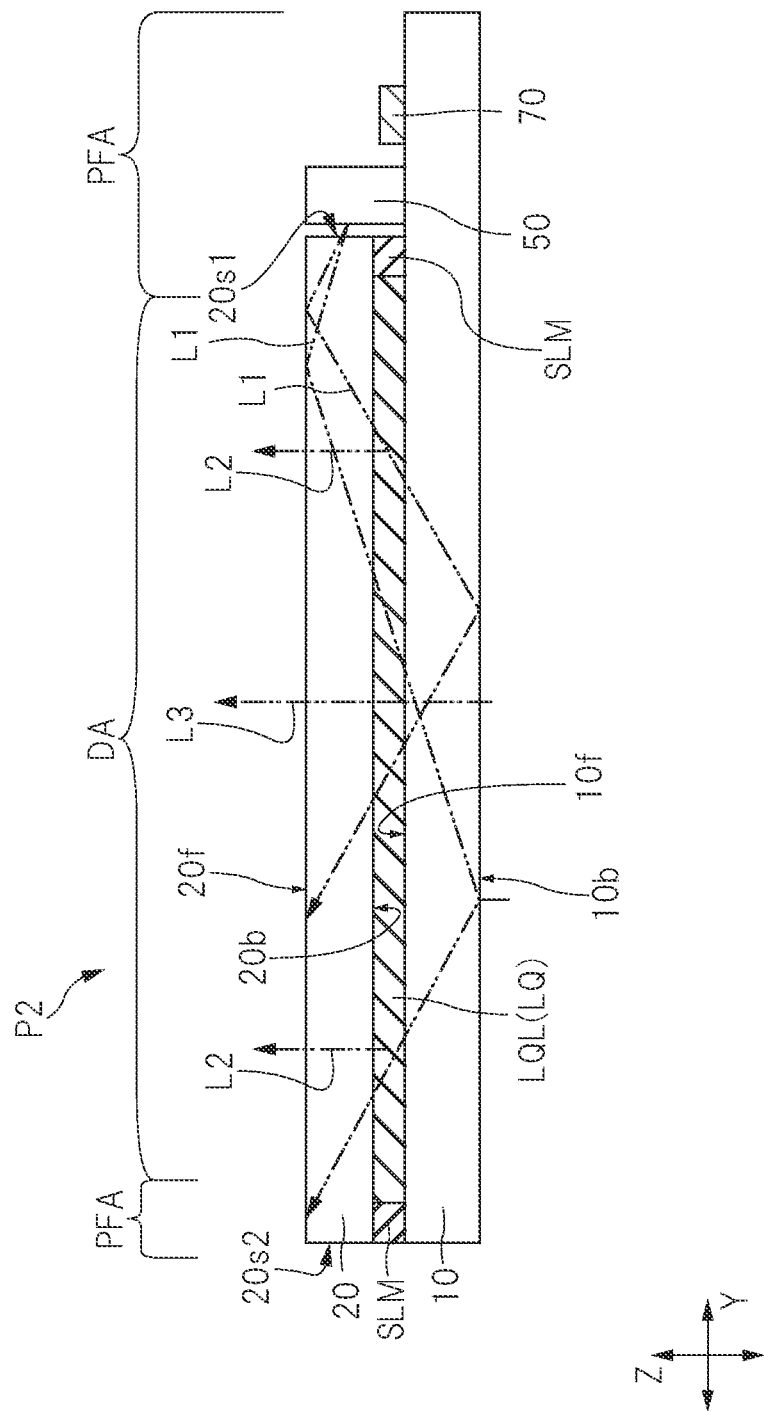
FIG. 5 is an explanatory diagram schematically showing a path of light emitted from a light source unit of a transparent display device according to a studied example.

FIG. 3 is a perspective view showing an example of the transparent display panel shown in FIG. 1. In FIG. 3, the boundary between the display region DA and the peripheral region PFA is indicated by a dashed-two-dotted line. Further, in FIG. 3, a part of signal wirings that transmit signals for driving the liquid crystal (more specifically, gate lines GL and source lines SL) in the circuits provided in the display panel P1 are schematically indicated by dashed-dotted lines. In the following drawings including FIG. 3, the direction along the thickness direction of the display panel P1 is defined as the Z direction, the extending direction of one side of the display panel P1 in the X-Y plane orthogonal to the Z direction is defined as the X direction, and the direction intersecting with the X direction is defined as the Y direction. FIG. 4 is a cross-sectional view taken along the line A-A in FIG. 3. FIG. 5 is an explanatory diagram schematically showing a path of light emitted from a light source unit of a transparent display device according to a studied example.

As shown in FIG. 3, the display panel P1 of the present embodiment includes a substrate (array substrate) 10, a substrate (counter substrate) 20, a light guide plate (referred to also as a first light guide plate or a first cover glass) 30, a light guide plate (referred to also as a second light guide plate or a second cover glass) 40, a light source unit (first light source unit) 50, a light source unit (second light source unit) 60, and a drive circuit 70.

When configured as a display device, for example, it may include a control circuit, a flexible substrate connected to the display panel P1, or a housing in addition to the respective parts provided in the display panel P1 shown in FIG. 3. In FIG. 3, illustration of the parts other than the display panel P1 is omitted.

The display panel P1 has the display region DA in which an image is formed in accordance with an input signal supplied from outside and the peripheral region (frame region) PFA around the display region DA. Although the display region DA of the display panel P1 shown in FIG. 3 is rectangular, the display region may have a shape other than a rectangular shape such as a polygonal shape or a circular shape. The display region DA is an effective region in which the display panel P1 displays an image in a plan view showing the display surface. Each of the substrate 10, the substrate 20, the light guide plate 30, and the light guide plate 40 is located so as to overlap the display region DA in a plan view. In the example shown in FIG. 1, the light source unit 50, the light source unit 60, and the drive circuit 70 are each mounted on the substrate 10. However, as a modification, a light source substrate (not shown) may be attached separately from the substrate 10 to the peripheral region PFA of the substrate 10, and the light source unit 50 and the light source unit 60 may be mounted on the light source substrate (not shown).

First, an optical path of light emitted from the light source unit 50 in the display panel P1 shown in FIG. 3 will be described. For ease of understanding, a display panel P2 having a simplified structure as shown in FIG. 5 will be used for the description. Note that the display panel P2 shown in FIG. 5 is the same as the display panel P1 shown in FIG. 4 except that the display panel P2 does not have the light guide plate 30, the light guide plate 40, and the light source unit 60. Therefore, the following description of the display panel P2 can be applied also to the display panel P1 shown in FIG. 4.

As shown in FIG. 5, the display panel P2 has the substrate 10 and the substrate 20 that are bonded so as to face each other with a liquid crystal layer LQL interposed therebetween. The substrate 10 and the substrate 20 are arranged in the Z direction, which is the thickness direction of the display panel P2. In other words, the substrate 10 and the substrate 20 face each other in the thickness direction of the display panel P2 (Z direction). The substrate 10 has a front surface (main surface, surface) 10f facing the liquid crystal layer LQL (and the substrate 20). Also, the substrate 20 has a back surface (main surface, surface) 20b facing the front surface 10f of the substrate 10 (and the liquid crystal layer LQL). The substrate 10 is an array substrate in which a plurality of transistors (transistor elements) as switching elements (active elements) Tr (see FIG. 6) are arranged in an array. Further, the substrate 20 is a substrate provided on the display surface side. The substrate 20 can be restated as a counter substrate in the sense that it is a substrate arranged to face the array substrate.

The liquid crystal layer LQL containing a liquid crystal LQ is present between the front surface 10f of the substrate 10 and the back surface 20b of the substrate 20. The liquid crystal layer LQL is an optical modulation element. The display panel P2 has a function of modulating the light passing therethrough by controlling the state of the electric field formed around the liquid crystal layer LQL via the switching elements described above. The display region DA in the substrate 10 and the substrate 20 overlaps the liquid crystal layer LQL as shown in FIG. 5.

Also, the substrate 10 and the substrate 20 are bonded via a sealing portion (sealing material) SLM. As shown in FIG. 3 and FIG. 5, the sealing portion SLM (see FIG. 5) is arranged in the peripheral region PFA so as to surround the display region DA. Inside the sealing portion SLM, the liquid crystal layer LQL is present as shown in FIG. 5. The sealing portion SLM serves as a seal that seals the liquid crystal between the substrate 10 and the substrate 20. In addition, the sealing portion SLM serves as an adhesive that bonds the substrate 10 and the substrate 20 together.

The light source unit 50 is arranged at a position facing a side surface (substrate side surface) 20s1 of the substrate 20. As schematically indicated by dashed-two-dotted lines in FIG. 5, light source light L1 emitted from the light source unit 50 propagates in a direction away from the side surface 20s1 while being reflected by the back surface 10b of the substrate 10 and the front surface 20f of the substrate 20. In the propagation path of the light source light L1, the back surface 10b of the substrate 10 and the front surface 20f of the substrate 20 are interfaces between a medium with a large refractive index and a medium with a small refractive index. Therefore, when the incident angles at which the light source light L1 enters the front surface 20f and the back surface 10b are larger than the critical angle, the light source light L1 is totally reflected at the front surface 20f and the back surface 10b.

The liquid crystal LQ is a polymer dispersed liquid crystal LC (see FIG. 6) and contains a liquid crystalline polymer and liquid crystal molecules. The liquid crystalline polymer is formed in a striped shape, and the liquid crystal molecules are dispersed in the gaps of the liquid crystalline polymer. Each of the liquid crystalline polymer and liquid crystal molecules has optical anisotropy or refractive index anisotropy. The responsiveness of liquid crystalline polymer to an electric field is lower than the responsiveness of liquid crystal molecules to an electric field. The orientation direction of the liquid crystalline polymer hardly changes regardless of the presence or absence of an electric field. On the other hand, the orientation direction of the liquid crystal molecules changes in accordance with the electric field in the state where a voltage higher than the threshold value is being applied to the liquid crystal LQ. In the state where no voltage is applied to the liquid crystal LQ, the optical axes of the liquid crystalline polymer and the liquid crystal molecules are parallel to each other, and the light source light L1 that has entered the liquid crystal layer LQL is transmitted through the liquid crystal layer LQL with almost no scattering (transparent state). In the state where a voltage is being applied to the liquid crystal LQ, the optical axes of the liquid crystalline polymer and the liquid crystal molecules cross each other, and the light source light L1 that has entered the liquid crystal layer LQL is scattered in the liquid crystal layer LQL (scattering state). The display panel P2 controls the transparent state and the scattering state by controlling the orientation of the liquid crystal LQ in the propagation path of the light source light L1. In the scattering state, the light source light L1 is emitted by the liquid crystal LQ from the front surface 20f to the outside of the display panel P2 as emitted light L2. Also, background light L3 that has entered from the back surface 10b passes through the substrate 10, the liquid crystal layer LQL, and the substrate 20, and is emitted to the outside from the front surface 20f. The emitted light L2 and the background light L3 are visually recognized by an observer on the side of the front surface 20f. The observer can recognize the emitted light L2 and the background light L3 in combination. A display panel in which an observer can recognize a display image and a background superimposed on each other in this way is referred to as a transparent display panel.

The display panel P1 shown in FIG. 4 is different from the display panel P2 shown in FIG. 5 in that the light source unit 50 is arranged at the position facing the light guide plate 40 and the light source light L1 reaches the liquid crystal layer LQL via the light guide plate 40. Also, the display panel P1 is different from the display panel P2 shown in FIG. 5 in that the light source unit 60 is further provided. In addition, the display panel P1 is different from the display panel P2 shown in FIG. 5 in that light source light L60 reaches the liquid crystal layer LQL via the light guide plate 30, a reflection film 80, and the light guide plate 40. Except for the above points, the display panel P1 is the same as the display panel P2. The display panel P1 and the display panel P2 are transparent display devices. From the viewpoint of improving the quality of the display image by reducing the luminance gradient phenomenon described later, it is important to reduce variations in the amount of light reaching the liquid crystal layer LQL in the entire display region DA.

<Configuration Example of Circuits>

Figure 6:
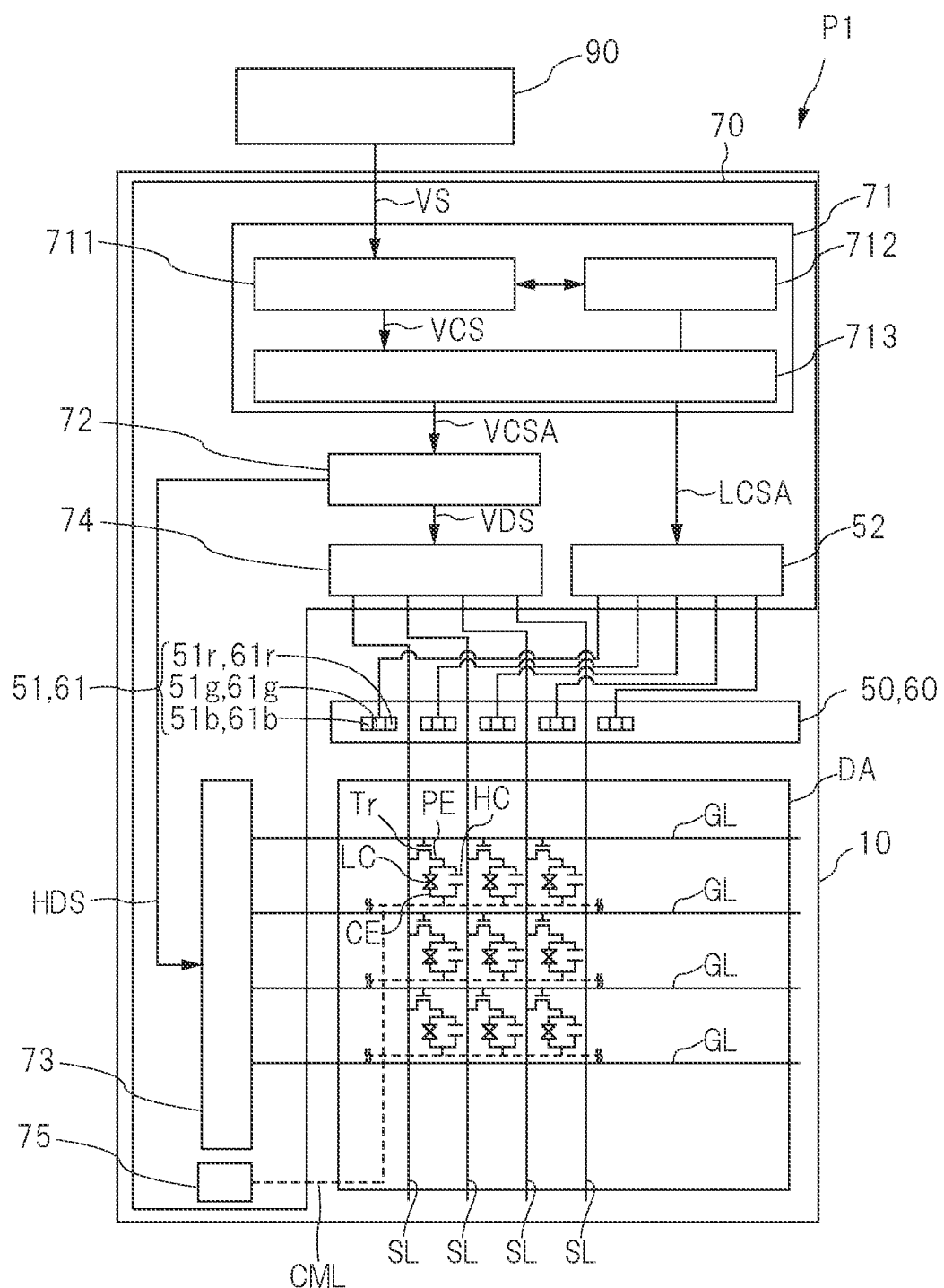
FIG. 6 is a circuit block diagram showing an example of circuits provided in the display panel in FIG. 3.

Next, a configuration example of circuits provided in the display panel P1 shown in FIG. 3 will be described. FIG. 6 is a circuit block diagram showing an example of circuits provided in the display panel in FIG. 3. A wiring path connected to a common electrode CE shown in FIG. 6 is formed on, for example, the substrate 20 shown in FIG. 5. In FIG. 6, wirings formed on the substrate 20 are indicated by dotted lines. In the example shown in FIG. 6, a light source control unit 52 is included in the drive circuit 70. As a modification, the light source unit 50, the light source unit 60, and the light source control unit 52 may be provided separately from the drive circuit 70. As described above, a light source substrate (not shown) may be attached separately from the substrate 10 to the peripheral region PFA of the substrate 10 shown in FIG. 3, and the light source unit 50 and the light source unit 60 may be mounted on the light source substrate (not shown). In this case, for example, the light source control unit 52 is formed on the light source substrate (not shown). Alternatively, the light source control unit 52 is formed in an electronic component mounted on the light source substrate (not shown).

In the example shown in FIG. 6, the drive circuit 70 includes a signal processing circuit 71, a pixel control circuit 72, a gate drive circuit 73, a source drive circuit 74, and a common potential drive circuit 75. Also, the light source unit 50 includes, for example, a light emitting diode element 51r, a light emitting diode element 51g, and a light emitting diode element 51b. As shown in FIG. 3, the substrate 10 has a larger area than the substrate 20, and thus the drive circuit 70 is provided on the substrate 10.

The signal processing circuit 71 includes an input signal analyzing unit (input signal analyzing circuit) 711, a storage unit (storage circuit) 712, and a signal adjusting unit 713. The display panel P1 includes a control unit 90 having a control circuit for controlling image display, and the input signal analyzing unit 711 of the signal processing circuit 71 receives an input signal VS from the control unit 90 via a wiring path such as a flexible wiring board (not shown). The input signal analyzing unit 711 performs analysis processing based on the input signal VS input from the outside to generate an input signal VCS. The input signal VCS is, for example, a signal to determine what gradation value is given to each pixel PIX (see FIG. 3) of the display panel P1 (see FIG. 3) based on the input signal VS.

The signal adjusting unit 713 generates an input signal VCSA from the input signal VCS input from the input signal analyzing unit 711. The signal adjusting unit 713 sends the input signal VCSA to the pixel control circuit 72 and sends a light source control signal LCSA to the light source control unit 52. The light source control signal LCSA is, for example, a signal containing information on the amount of light of the light source unit 50 and the light source unit 60 that is set in accordance with the input gradation value to the pixel PIX.

The pixel control circuit 72 generates a horizontal drive signal HDS and a vertical drive signal VDS based on the input signal VCSA. For example, since driving is performed by the field sequential method in the present embodiment, the horizontal drive signal HDS and the vertical drive signal VDS are generated for each color that the light source unit 50 and the light source unit 60 can emit. The gate drive circuit 73 sequentially selects the gate lines GL of the display panel P1 (see FIG. 3) within one vertical scanning period based on the horizontal drive signal HDS. The order of selection of the gate lines GL is arbitrary. As shown in FIG. 3, a plurality of gate lines (signal wiring) GL extend in the X direction and are arranged along the Y direction.

The source drive circuit 74 supplies a gradation signal in accordance with the output gradation value of each pixel PIX (see FIG. 3) to each source line SL of the display panel P1 (see FIG. 3) within one horizontal scanning period based on the vertical drive signal VDS. As shown in FIG. 3, a plurality of source lines (signal wiring) SL extend in the Y direction and are arranged along the X direction. One pixel PIX is formed at each intersection of the gate line GL and the source line SL. A switching element Tr (see FIG. 6) is formed at each intersection of the gate line GL and the source line SL. The plurality of gate lines GL and the plurality of source lines SL shown in FIG. 3 and FIG. 6 correspond to a plurality of signal wirings that transmit drive signals for driving the liquid crystal LQ shown in FIG. 4 (and FIG. 5).

For example, a thin film transistor is used as the switching element Tr shown in FIG. 6. The type of thin film transistor is not particularly limited, and the following can be exemplified. When classified according to the position of the gate, bottom gate transistors and top gate transistors can be presented. In addition, when classified according to the number of gates, single gate thin film transistors and double gate thin film transistors can be presented. One of the source electrode and the drain electrode of the switching element Tr is connected to the source line SL, the gate electrode is connected to the gate line GL, and the other of the source electrode and the drain electrode is connected to one end of the capacitor of the polymer dispersed liquid crystal LC (liquid crystal LQ shown in FIG. 4 and FIG. 5). One end of the capacitor of the polymer dispersed liquid crystal LC is connected to the switching element Tr via the pixel electrode PE, and the other end thereof is connected to a common potential wiring CML via the common electrode CE. Also, a holding capacitor HC is generated between the pixel electrode PE and a holding capacitor electrode electrically connected to the common potential wiring CML. Note that a common potential is supplied to the common potential wiring CML from the common potential drive circuit 75.

<Problem of Transparent Display Device>

Next, the problem of the transparent display device and the solution thereof will be described. The display panel P2 shown in FIG. 5 has a structure in which the light source unit 50 is arranged at a position that does not overlap with the display region DA in order to ensure visible light transmissivity of the front surface and the back surface. In addition, the display panel P2 has a mechanism in which the light source light L1 is reflected by utilizing the difference in refractive index between the substrates 10 and 20 functioning as light guide members and the surrounding air layer, thereby delivering the light to a side surface 20s2 on the side opposite to the side surface 20s1 facing the light source unit 50.

However, in the case of the structure of the display panel P2, the phenomenon in which the luminance of a region far from the light source unit 50 is lower than that of a region near the light source unit 50 in the display region DA is observed. Hereinafter, this phenomenon is referred to as luminance gradient phenomenon. The inventors of this application have studied the technique for reducing the luminance gradient phenomenon. First, since the luminance in the region near the light source unit 50 becomes relatively high in the luminance gradient phenomenon, the method in which another light source is provided at the position facing the side surface 20s2 on the side opposite to the side surface 20s1 in addition to the light source unit 50 arranged at the position facing the side surface 20s1 in FIG. 5 is conceivable.

However, in this method, the light source units are arranged on at least two sides of the four sides of the rectangular display region. Since the light source units do not have visible light transmissivity, the background 101 shown in FIG. 2 cannot be visually recognized in the sides where the light source units are arranged. In consideration of the visibility of the background which is a feature of the transparent display device, it is preferable that the number of sides on which the light source units are arranged is as small as possible.

Then, the inventors of this application have proceeded with the study and found the structure shown in FIG. 4. The display panel (display device) P1 shown in FIG. 4 includes the substrate 10 having the front surface 10f and the back surface 10b on the side opposite to the front surface 10f, the substrate 20 having the back surface 20b facing the front surface 10f and the front surface 20f on the side opposite to the back surface 20b, and the liquid crystal layer LQL arranged between the front surface 10f of the substrate 10 and the back surface 20b of the substrate 20. This point is the same as the display panel P2 shown in FIG. 5. In addition to the above, the display panel P1 shown in FIG. 4 includes the light guide plate 30 bonded and fixed on the back surface 10b of the substrate 10 via an adhesive layer 31, the light guide plate 40 bonded and fixed on the front surface 20f of the substrate 20 via an adhesive layer 41, the light source unit 60 which includes a plurality of light emitting diode elements 61, is arranged on the back surface 10b of the substrate 10, and is arranged at a position facing a side surface 30s1 of the light guide plate 30, and the light source unit 50 which includes a plurality of light emitting diode elements 51, is arranged on the front surface 10f of the substrate 10, and is arranged at a position facing a side surface 40s1 of the light guide plate 40.

Also, the side surface (light incident side surface) 30s1 of the light guide plate 30 and the side surface (light incident side surface) 40s1 of the light guide plate 40 are on the same side in the first direction (the Y direction in the example shown in FIG. 4). The adhesive layer 31 is arranged in the peripheral region PFA and is not arranged in the display region DA. The adhesive layer 41 is arranged in the display region DA and the peripheral region PFA. In the display region DA, an air layer 32 is interposed between the substrate 10 and the light guide plate 30, and the adhesive layer 41 is interposed between the substrate 20 and the light guide plate 40. Moreover, each of a side surface 30s2 and a side surface 40s2 is covered with a reflection film 80. The reflection film 80 has a reflection surface 80s1 attached to a first opposite side surface and a reflection surface 80s2 attached to a second opposite side surface. In the peripheral region PFA, the light guide plate 30, the adhesive layer 31, the substrate 10, the substrate 20, the adhesive layer 41, and the light guide plate 40 are interposed between the reflection surface 80s1 and the reflection surface 80s2.

As can be seen by comparing FIG. 4 and FIG. 5, the display panel P1 (see FIG. 4) differs from the display panel P2 (see FIG. 5) in that it includes the light guide plate 30 and the light guide plate 40. Also, the display panel P1 differs from the display panel P2 in that it further includes the light source unit 60 in addition to the light source unit 50. The light guide plate 30 has a front surface 30f facing the back surface 10b of the substrate 10 and a back surface 30b on the side opposite to the front surface 30f. Further, the light guide plate 30 has the side surface (light incident side surface) 30s1 facing the light source unit 60 and the side surface (opposite side surface) 30s2 located on the side opposite to the side surface 30s1 in the Y direction. The light guide plate 30 is bonded and fixed to the substrate 10 via the adhesive layer 31. However, as shown in FIG. 4, in the display region DA, the adhesive layer 31 is not arranged in the gap between the light guide plate 30 and the substrate 10, and the air layer 32 is interposed. In other words, in the display region DA, the light guide plate 30 and the substrate 10 face each other with the air layer 32 interposed therebetween. In the example shown in FIG. 4, the adhesive layer 31 is adhered to the front surface 30f of the light guide plate 30 in the peripheral region PFA. The light source light L60 emitted from the light source unit 60 enters the light guide plate 30 from the side surface 30s1 and travels toward the side surface 30s2 while being reflected by the front surface 30f and the back surface 30b.

Similarly, the light guide plate 40 has a back surface 40b facing the front surface 20f of the substrate 20 and a front surface 40f on the side opposite to the back surface 40b. Also, the light guide plate 40 has the side surface (light incident side surface) 40s1 facing the light source unit 50 and the side surface (opposite side surface) 40s2 located on the side opposite to the side surface 40s1 in the Y direction. The light guide plate 40 is bonded and fixed to the substrate 20 via the adhesive layer 41. At least in the display region DA, the gap between the light guide plate 40 and the substrate 20 is filled with the adhesive layer 41. In the example shown in FIG. 4, the adhesive layer 41 is bonded to the entire front surface 40f of the light guide plate 40. Light source light L50 emitted from the light source unit 50 enters the light guide plate 40 from the side surface 40s1 and travels toward the side surface 40s2 while being reflected.

Each of the adhesive layer 31 and the adhesive layer 41 is made of a transparent resin material that can transmit visible light. Examples of the adhesive layer 31 and the adhesive layer 41 that transmit visible light include a transparent adhesive sheet referred to as OCA (Optical Clear Adhesive) formed in a sheet shape and an OCR (Optical Clear Resin) obtained by curing a liquid transparent adhesive. For example, the adhesive layer 31 and the adhesive layer 41 are made of the same material. However, as a modification, the adhesive layer 31 and the adhesive layer 41 may be made of different materials. For example, as described later, the adhesive layer 31 needs to bond and fix the substrate 10 and the light guide plate 30 in a smaller adhesive area as compared with the adhesive layer 41, and thus the adhesive layer 31 may be made of a material with relatively high adhesive strength.

Although there are various modifications of the refractive indices of the substrate 10, the substrate 20, the light guide plate 30, and the light guide plate 40, these refractive indices are, for example, about 1.5. The refractive indices of the adhesive layer 31 and the adhesive layer 41 are close to the refractive index of the light guide plate 40 and are, for example about 1.47 to 1.5. In this case, most of the light source light L50 is not reflected at the interface between the light guide plate 40 and the adhesive layer 41 and travels toward the substrate 20 in the vicinity of the side surface 40s1. As a result, the amount of the light source light L50 reaching the region near the side surface 40s2 is small. Namely, focusing only on the light source light L50 from the light source unit 50, the luminance gradient phenomenon occurs.

On the other hand, in the display region DA, the adhesive layer 31 is not interposed between the substrate 10 and the light guide plate 30, and the air layer 32 is interposed. In this case, the light source light L60 is totally reflected by the front surface 30f and the back surface 30b of the light guide plate 30 and travels toward the side surface 30s2. The light source light L60 that has reached the side surface 30s2 is reflected by the reflection surface 80s1. In the example shown in FIG. 4, the reflection surface 80s1 is an inclined surface that is inclined with respect to the front surface 30f of the light guide plate 30. In the example shown in FIG. 4, for example, the angle formed by the front surface 30f of the light guide plate 30 and the reflection surface 80s1 is 45 degrees. Therefore, the light source light L60 that has been reflected by the reflection surface 80s1 travels toward the substrate 20. As described above, in the peripheral region PFA, the light guide plate 30, the adhesive layer 31, the substrate 10, the substrate 20, the adhesive layer 41, and the light guide plate 40 are interposed between the reflection surface 80s1 and the reflection surface 80s2. Therefore, reflected light L61 that has been reflected by the reflection surface 80s1 reaches the reflection surface 80s2 via the adhesive layer 31, the substrate 10, the substrate 20, the adhesive layer 41, and the light guide plate 40. In the example shown in FIG. 4, since the sealing portion SLM is arranged between the substrate 10 and the substrate 20 in the peripheral region PFA, the reflected light L61 passes also through the sealing portion SLM. However, as a modification, the reflected light L61 may pass through the liquid crystal layer LQL.

The reflected light L61 that has reached the reflection surface 80s2 is reflected again by the reflection surface 80s2. In the example shown in FIG. 4, the reflection surface 80s2 is an inclined surface that is inclined with respect to the back surface 40b of the light guide plate 40. In the example shown in FIG. 4, for example, the angle formed by the back surface 40b of the light guide plate 40 and the reflection surface 80s2 is 45 degrees. Therefore, the reflected light L61 that has been reflected by the reflection surface 80s1 travels toward the front surface 40f of the light guide plate 40 as reflected light L62.

The refractive indices of the substrate 10, the substrate 20, the light guide plate 30, the light guide plate 40, and the adhesive layer 41 are as described above. In this case, most of the reflected light L62 is not reflected at the interface between the light guide plate 40 and the adhesive layer 41 and travels toward the substrate 20 in the vicinity of the side surface 40s2. As a result, the amount of the light source light L60 reaching the region near the side surface 40s1 is small. Namely, focusing only on the behavior of the light source light L60 from the light source unit 60, the luminance gradient phenomenon occurs.

Here, by combining the behavior of the light source light L50 and the behavior of the light source light L60, the luminance of the entire display region DA is resultantly improved to be uniform. In the display region DA, the luminance in the regions near the side surface 30s1 and the side surface 40s1 is defined mainly by the light source light L50 emitted from the light source unit 50. On the other hand, the luminance in the regions near the side surface 30s2 and the side surface 40s2 is defined mainly by the light source light L60 emitted from the light source unit 60. The light intensity of the light source light L50 and the light intensity of the light source light L60 do not necessarily have to be the same, and the light intensity of the light source light L60 whose optical path to reach the liquid crystal layer LQL is relatively longer can be made stronger than the light intensity of the light source light L50. By adjusting the light intensity of the light source light L50 and the light intensity of the light source light L60 in this way, it is possible to reduce the luminance gradient phenomenon in the entire display region DA.

As shown in FIG. 4, according to the present embodiment, the light source light L60 is guided to the side of the side surface 40s2 of the light guide plate 40 by using the reflection of the light source light L60 by the reflection film 80. As a result, the luminance gradient phenomenon can be reduced as in the case where the light source unit 60 is arranged on the side of the side surface 40s2. Further, in the case of the present embodiment, the light source unit 60 overlaps the light source unit 50 in the thickness direction of the display panel P1. Therefore, visibility of the background 101 shown in FIG. 2 is less likely to be degraded even on the side of the side surface 40s2. Strictly speaking, since the region covered with the reflection film 80 does not transmit visible light, there is a slight region where the background 101 (see FIG. 2) cannot be visually recognized even on the side of the side surface 40s2. However, as compared with the structure in which the light source unit 60 is arranged on the side of the side surface 40s2, the area of that region can be effectively reduced to a negligible size.

The features of the transparent display device capable of reducing the luminance gradient phenomenon such as the display panel P1 shown in FIG. 4 can be express as follows when focusing on the light guide path of the light source light L60. That is, the light source light L60 emitted from the light source unit 60 reaches the reflection surface 80s2 via the light guide plate 30, the reflection surface 80s1, the adhesive layer 31, the substrate 10, the substrate 20, the adhesive layer 41, and the light guide plate 40. For example, even when the reflection surface 80s1 and the reflection surface 80s2 shown in FIG. 4 are not simply inclined surfaces but curved surface, the luminance gradient phenomenon can be reduced if the light source light L60 reaches the reflection surface 80s2 via the light guide plate 30, the reflection surface 80s1, the adhesive layer 31, the substrate 10, the substrate 20, the adhesive layer 41, and the light guide plate 40. Moreover, the angle between the reflection surface 80s1 and the front surface 30f of the light guide plate 30 and the angle between the reflection surface 80s2 and the back surface 40b of the light guide plate 40 are preferably 45 degrees. However, even when these angles are other than 45 degrees, the luminance gradient can be reduced if the optical path of the light source light L60 is configured as described above.

<Layout of Adhesive Layer>

Figure 7:
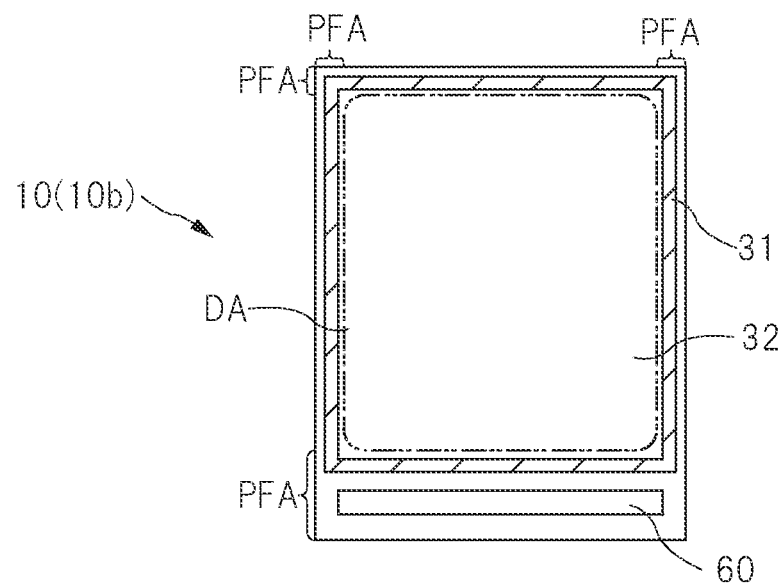
FIG. 7 is a plan view showing an example of a layout of an adhesive layer and an air layer arranged on a back surface of an array substrate (substrate on a back surface side) shown in FIG. 4.
Figure 8:
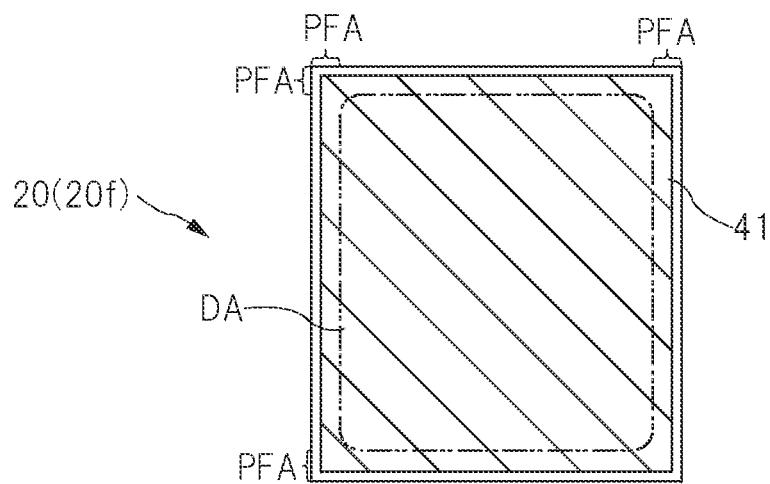
FIG. 8 is a plan view showing an example of a layout of an adhesive layer arranged on a counter substrate (substrate on a front surface side) shown in FIG. 4.

Next, the layout of the adhesive layer 31 shown in FIG. 4 will be described. FIG. 7 is a plan view showing an example of a layout of an adhesive layer and an air layer arranged on a back surface of an array substrate (substrate on a back surface side) shown in FIG. 4. FIG. 8 is a plan view showing an example of a layout of an adhesive layer arranged on a counter substrate (substrate on a front surface side) shown in FIG. 4. Although FIG. 7 and FIG. 8 are plan views, hatching is applied to the adhesive layers in order to clearly show the positional relationship between the display region and the adhesive layers.

In the example shown in FIG. 7, the adhesive layer 31 is not arranged in the display region DA, and is arranged in the peripheral region PFA so as to surround the display region DA. The air layer 32 is arranged inside the frame-shaped adhesive layer 31. Various modifications of the layout of the adhesive layer 31 can be applied as long as the substrate 10 and the light guide plate 30 shown in FIG. 4 can be bonded and fixed via the adhesive layer 31, but the adhesive strength between the substrate 10 and the light guide plate 30 (see FIG. 4) can be improved by arranging the adhesive layer 31 so as to continuously surround the display region DA as shown in FIG. 7. Note that no adhesive layer 31 is arranged in the display region DA in the example shown in FIG. 7. This configuration is particularly preferable because it is possible to reliably prevent the light source light L60 shown in FIG. 4 from reaching the liquid crystal layer from the side of the front surface 30f of the light guide plate 30. However, as a modification, a part of the adhesive layer 31 may be arranged in the display region DA at the outer edge of the display region DA.

On the other hand, as shown in FIG. 8, the adhesive layer 41 is arranged over the peripheral region PFA and the display region DA. The adhesive layer 41 is required to have the function of suppressing the reflection of the light source light L50 and the reflected light 62 and transmitting the light to the liquid crystal layer LQL in the display region DA as shown in FIG. 4. For this reason, the adhesive layer 41 is preferably arranged at least over the entire display region DA. Although the adhesive layer 41 may not be arranged in the peripheral region PFA in some cases, it is preferable that the adhesive layer 41 is arranged also in the peripheral region PFA from the viewpoint of suppressing the reflection and scattering of light in the peripheral region.

<Modification of Reflection Film>

Figure 9:
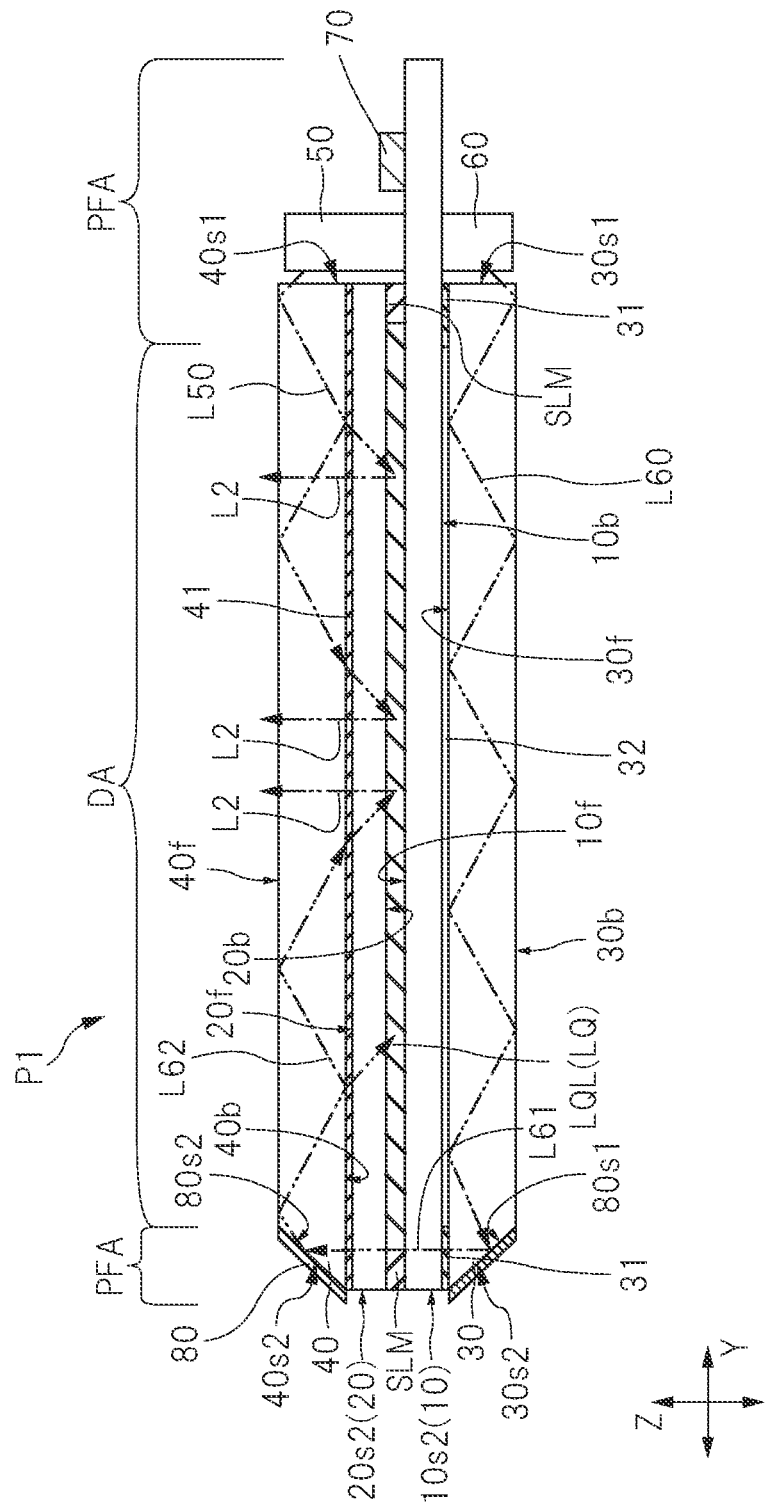
FIG. 9 is a cross-sectional view showing another modification with respect to FIG. 4.

FIG. 9 is a cross-sectional view showing another modification with respect to FIG. 4. A display panel (display device) P3 shown in FIG. 9 differs from the structure shown in FIG. 4 in that the reflection film 80 is divided and attached to each of the side surfaces 30s2 and 40s2. The substrate 10 has a side surface (substrate side surface) 10s2, and the substrate 20 has a side surface (substrate side surface) 20s2. Focusing on guiding the light source light L60 to the side of the light guide plate 40, it can be realized also by the configuration of the display panel P3 shown in FIG. 9. However, from the viewpoint of preventing the light emission from the side surface 10s2 and the side surface 20s2, it is particularly preferable that the reflection film 80 is in close contact with the side surface 30s2, the side surface 40s2, the side surface 10s2, and the side surface 20s2 as shown in FIG. 4.

In the foregoing, the embodiment and typical modifications have been described. However, the technique described above can be applied to various modifications other than the above-described modifications. For example, the above-described modifications may be combined.

A person having ordinary skill in the art can make various alterations and corrections within a range of the idea of the present invention, and it is interpreted that the alterations and corrections also belong to the scope of the present invention. For example, the embodiments obtained by performing addition or elimination of components or design change or the embodiments obtained by performing addition or reduction of process or condition change to the embodiments described above by a person having an ordinary skill in the art are also included in the scope of the present invention as long as they include the gist of the present invention.

The present invention can be applied to display devices and electronic devices incorporating display devices.

What is claimed is:

1. A display device having a display region and a peripheral region around the display region, the display device comprising:
    a first substrate having a first front surface and a first back surface on a side opposite to the first front surface;
    a second substrate having a second back surface facing the first front surface and a second front surface on a side opposite to the second back surface;
    a liquid crystal layer arranged between the first front surface of the first substrate and the second back surface of the second substrate;
    a first light guide plate which has a first light incident side surface and a first opposite side surface located on a side opposite to the first light incident side surface in a first direction and is bonded and fixed on the first back surface of the first substrate via a first adhesive layer;
    a second light guide plate which has a second light incident side surface and a second opposite side surface located on a side opposite to the second light incident side surface in the first direction and is bonded and fixed on the second front surface of the second substrate via a second adhesive layer;
    a first light source unit which includes a plurality of first light emitting diode elements, is arranged on the first back surface of the first substrate, and is arranged at a position facing the first light incident side surface of the first light guide plate;
    a second light source unit which includes a plurality of second light emitting diode elements, is arranged on the first front surface of the first substrate, and is arranged at a position facing the second light incident side surface of the second light guide plate; and
    a reflection film covering the first opposite side surface and the second opposite side surface,
    wherein the first light incident side surface of the first light guide plate and the second light incident side surface of the second light guide plate are on the same side in the first direction,
    wherein the first adhesive layer is arranged in the peripheral region,
    wherein the second adhesive layer is arranged in the display region,
    wherein, in the display region, an air layer is interposed between the first substrate and the first light guide plate, and the second adhesive layer is interposed between the second substrate and the second light guide plate,
    wherein the reflection film has a first reflection surface attached to the first opposite side surface and a second reflection surface attached to the second opposite side surface, and
    wherein, in the peripheral region, the first light guide plate, the first adhesive layer, the first substrate, the second substrate, the second adhesive layer, and the second light guide plate are interposed between the first reflection surface and the second reflection surface.

2. The display device according to claim 1,
    wherein the first reflection surface is an inclined surface inclined at an angle of 45 degrees with respect to the first front surface, and the second reflection surface is an inclined surface inclined at an angle of 45 degrees with respect to the second back surface.

3. The display device according to claim 1,
    wherein the first adhesive layer is not arranged in the display region and is arranged in the peripheral region so as to surround the display region.

4. The display device according to claim 3,
wherein the second adhesive layer is arranged in the display region and the peripheral region.

5. The display device according to claim 1,
wherein the first substrate has a first substrate side surface,
wherein the second substrate has a second substrate side surface, and
wherein the reflection film is in close contact with the first opposite side surface, the second opposite side surface, the first substrate side surface, and the second substrate side surface.

6. A display device having a display region and a peripheral region around the display region, the display device comprising:
a first substrate having a first front surface and a first back surface on a side opposite to the first front surface;
a second substrate having a second back surface facing the first front surface and a second front surface on a side opposite to the second back surface;
a liquid crystal layer arranged between the first front surface of the first substrate and the second back surface of the second substrate;
a first light guide plate which has a first light incident side surface and a first opposite side surface located on a side opposite to the first light incident side surface in a first direction and is bonded and fixed on the first back surface of the first substrate via a first adhesive layer;
a second light guide plate which has a second light incident side surface and a second opposite side surface located on a side opposite to the second light incident side surface in the first direction and is bonded and fixed on the second front surface of the second substrate via a second adhesive layer;
a first light source unit which includes a plurality of first light emitting diode elements, is arranged on the first back surface of the first substrate, and is arranged at a position facing the first light incident side surface of the first light guide plate;
a second light source unit which includes a plurality of second light emitting diode elements, is arranged on the first front surface of the first substrate, and is arranged at a position facing the second light incident side surface of the second light guide plate; and
a reflection film covering the first opposite side surface and the second opposite side surface,
wherein the first light incident side surface of the first light guide plate and the second light incident side surface of the second light guide plate are on the same side in the first direction,
wherein the first adhesive layer is arranged in the peripheral region,
wherein the second adhesive layer is arranged in the display region,
wherein, in the display region, an air layer is interposed between the first substrate and the first light guide plate, and the second adhesive layer is interposed between the second substrate and the second light guide plate,
wherein the reflection film has a first reflection surface attached to the first opposite side surface and a second reflection surface attached to the second opposite side surface, and
wherein light emitted from the first light source unit reaches the second reflection surface via the first light guide plate, the first reflection surface, the first adhesive layer, the first substrate, the second substrate, the second adhesive layer, and the second light guide plate.

7. The display device according to claim 6,
wherein the first reflection surface is an inclined surface inclined at an angle of 45 degrees with respect to the first front surface, and the second reflection surface is an inclined surface inclined at an angle of 45 degrees with respect to the second back surface.

8. The display device according to claim 6,
wherein the first adhesive layer is not arranged in the display region and is arranged in the peripheral region so as to surround the display region.

9. The display device according to claim 8,
wherein the second adhesive layer is arranged in the display region and the peripheral region.

10. The display device according to claim 6,
wherein the first substrate has a first substrate side surface,
wherein the second substrate has a second substrate side surface, and
wherein the reflection film is in close contact with the first opposite side surface, the second opposite side surface, the first substrate side surface, and the second substrate side surface.

* * * * *